(No Model.) 2 Sheets—Sheet 1.

T. T. ECKERT & S. BERGMANN.
MOLD FOR THE FORMATION OF TYPE WHEELS.

No. 498,248. Patented May 30, 1893.

Witnesses.
John C. Sanders
Wm. Arnoux

Inventors:
Thomas T. Eckert
S. Bergmann
By their Attorney
C. L. Buckingham (No Model.) 2 Sheets—Sheet 2.

T. T. ECKERT & S. BERGMANN.
MOLD FOR THE FORMATION OF TYPE WHEELS.

No. 498,248. Patented May 30, 1893.

Witnesses.
John C. Sanders
Wm. Arnoux

Inventors.
Thomas T. Eckert
S. Bergmann
By their Attorney.
C. L. Buckingham

UNITED STATES PATENT OFFICE.

THOMAS T. ECKERT AND SIGMUND BERGMANN, OF NEW YORK, N. Y., ASSIGNORS TO THE WESTERN UNION TELEGRAPH COMPANY, OF SAME PLACE.

MOLD FOR THE FORMATION OF TYPE-WHEELS.

SPECIFICATION forming part of Letters Patent No. 498,248, dated May 30, 1893.

Application filed January 30, 1891. Serial No. 379,720½. (No model.)

*To all whom it may concern:*

Be it known that we, THOMAS T. ECKERT and SIGMUND BERGMANN, citizens of the United States of America, residing at the city, county, and State of New York, have made a new and useful Improvement in Molds for the Formation of Type-Wheels, of which the following is a specification.

Others have heretofore constructed typewheels entirely of hard rubber, the type being cast as a part of the wheel and upon its periphery. Type-wheels have also been constructed by forming raised characters upon a soft rubber band or ribbon, and attaching said band around the periphery of the wheel.

The object of our invention is to provide a type-wheel with soft rubber type, at the same time avoiding difficulties arising from the use of a ribbon fixed upon its cylindrical surface, which by wear is liable to become loosened, thus causing displacement of the characters and their misadjustment around its periphery. In wheels of printing-telegraphs and type-writers, where the characters are brought to position for printing by a step-by-step or other movement corresponding with that of a transmitter, it is important that the typographical characters be definitely fixed upon the wheel and in a determined relation to one another, and that they be not subject to displacement; otherwise a given movement of the type-wheel would not bring the corresponding characters into the required position.

Our invention is also applicable to the formation of soft rubber type upon plain as well as cylindrical surfaces of hard rubber bodies.

In carrying out our invention, in making type-wheels, we first form the body of the wheel of hard vulcanized rubber with a plain periphery. Letters formed of a soft rubber composition are then cast upon the periphery of wheel, and are next vulcanized until they assume the condition of tenacious soft rubber type firmly affixed to its surface.

Figure 1:
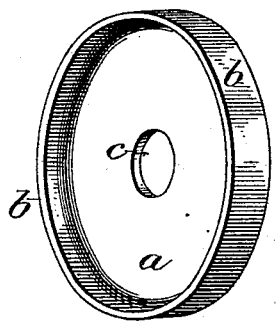
Figure 2:
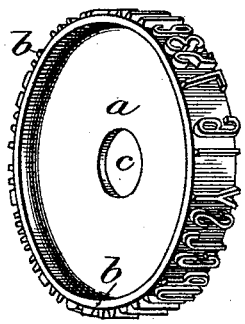
Figure 3:
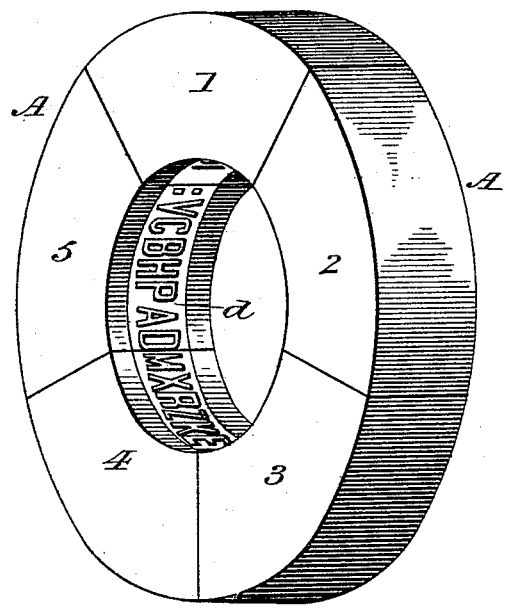
Figure 4:
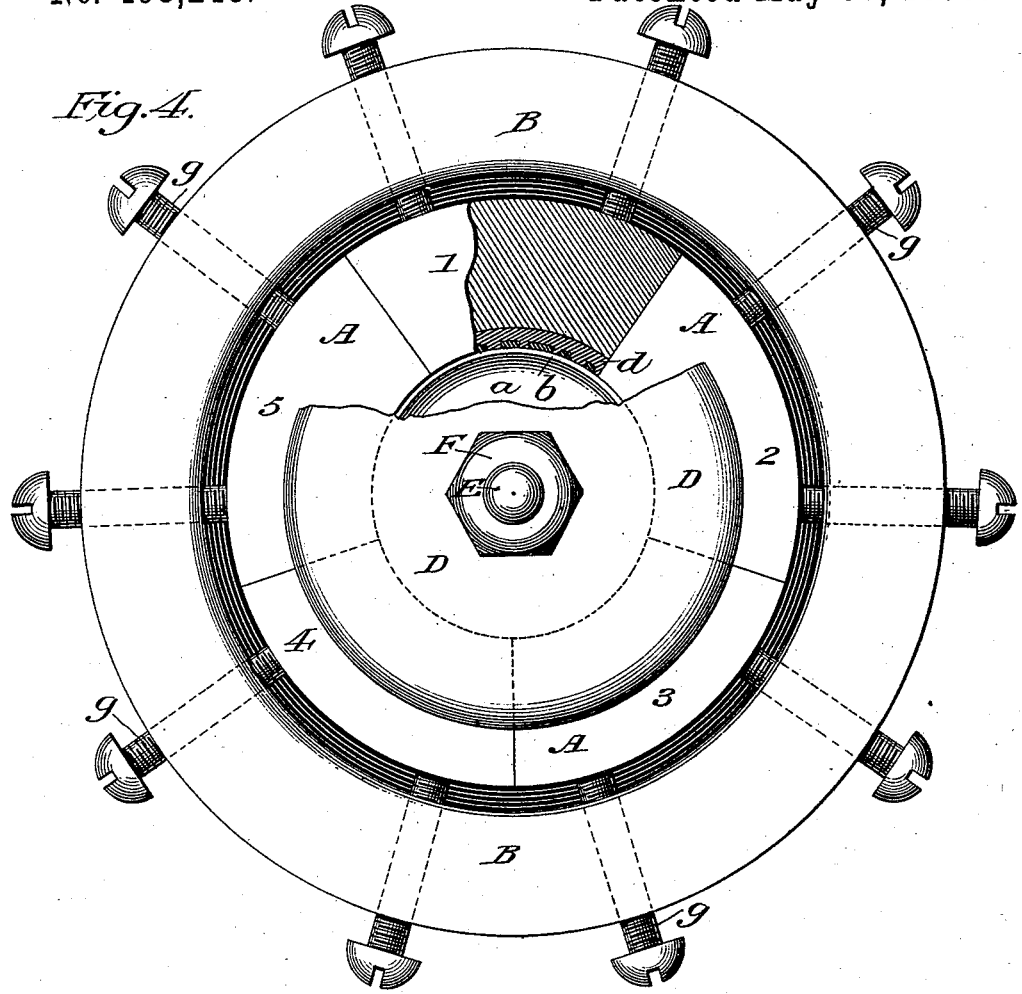
Figure 5:
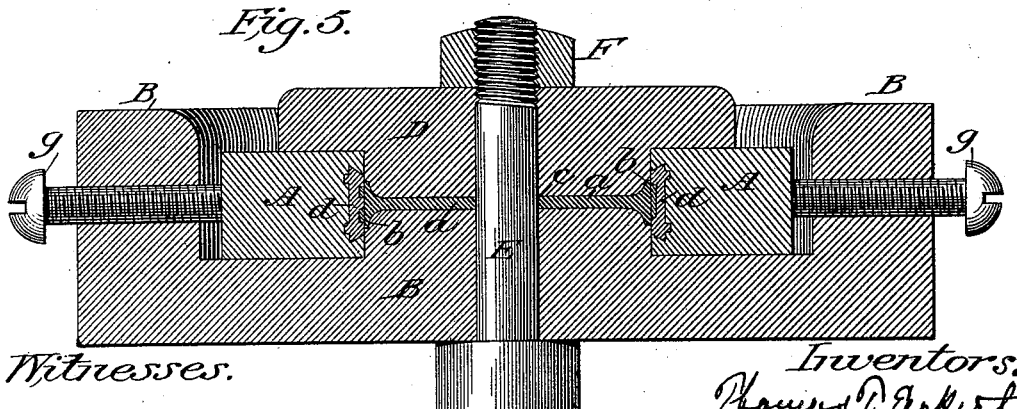

We will now describe our invention by reference to the accompanying drawings:

Figure 1 is a perspective view of a hard rubber wheel having a smooth periphery, upon which soft rubber type are subsequently cast and vulcanized. Fig. 2 represents the wheel after the type have been formed upon its periphery. Fig. 3 is a perspective view of the matrix or mold for giving form and arrangement to the type upon the periphery of the type-wheel. Fig. 4 is a top view of the matrix or mold and a holder containing the same, and a type-wheel, during the formation of the type thereon. Fig. 5 is a sectional view of the arrangement shown in Fig. 4.

Fig. 1 shows a hard rubber type-wheel having a peripheral band $b$ and a web or disk $a$, having a central shaft-opening $c$. The type-wheel body is first molded from a prepared soft rubber composition ordinarily used in making hard rubber, and which is known to the trade as heavinoid. The wheel body is then vulcanized by placing the molds in a hot water vulcanizer, commonly used by soft rubber stamp manufacturers, at about 320° Fahrenheit, or under a steam-gage pressure of about ninety pounds, for about an hour and a quarter. Soft rubber type are next formed upon the periphery of the wheel from a prepared composition of soft rubber by casting; and to this end we employ an annulus A consisting of several sections or sectors, (there being five shown in Fig. 3) the inner cylindrical surface of which is provided with such an arrangement of type-depressions or matrices, as will serve to mold the required type characters upon the periphery of the wheel. The type-depressions of the mold are cast in an inner band $d$, consisting of tin alloy, shown in Figs. 3 and 5, and having a dovetailed cross-section. The tin alloy is rendered comparatively rigid and hard by adding a small amount of antimony (three or four per cent.) thus preventing it from spinning or spreading at the ends of the sectors and displacing the type-depressions when placed under high pressure, as would be the case if only pure tin were employed.

The mold A which we employ for casting type upon the hard rubber body of the wheel, shown in Fig. 1, is so constructed as to tightly inclose its periphery as shown in Figs. 4 and 5, while the upper and lower surfaces of the wheel are inclosed between cap D and holder B, the two being clamped together by bolt E.

The matrices or type-depressions of mold A are next a little more than flushly filled with a soft rubber composition, hereinafter described, which is previously reduced to a plastic condition by a mild degree of heat. The sections of mold A are then placed within the holder B, and around the periphery b of the body of the type-wheel, while cap D is placed over bolt E, and nut F loosely screwed down. The matrix sectors of mold A are then pressed radially inward by set screws g g until the soft rubber filling, within the type-depressions, is closely pressed against the periphery of the type-wheel at all points of its circumference. When adjustment of the sectors of mold A has been effected, cap D is tightly depressed by nut F, and the mold is placed in a hot water vulcanizer, such as above referred to, under about ninety pounds steam-gage pressure, or 320° Fahrenheit, and so retained about half an hour.

The soft white composition of rubber gum, which we prefer to use in forming type, is a well known article of commerce, it being prepared for vulcanization, and is such as is ordinarily employed in making soft rubber type in hand stamps or similar marking devices. By following the method above described, it will be found that the type so formed are flexible and soft, and adapted to the purposes of a printing-telegraph or type-writer type-wheel. The characters printed from soft rubber are clear, while the shock sustained from taking impressions from metal or hard rubber type is almost entirely avoided. It will be observed that, although in appearance, the type are substantially the same as the body of the type-wheel, they are nevertheless soft and flexible, their softness and flexibility depending upon the time the mold is kept within the vulcanizer. But for the purposes in question we find that the best results are obtained by continuing the process of vulcanization for about half an hour.

What we claim, and desire to secure by Letters Patent, is—

1. The combination of a circular mold A, formed of two or more sectors, each of said sectors being provided with two or more type-depressions upon its inner cylindrical surface, and adjusting devices for placing said sectors in close proximity to each other and a centrally-arranged cylindrical hub.

2. The combination of a circular mold A, an inlaid band of tin alloy d, and type-depressions formed within the cylindrical surface of said band.

3. In a circular mold A, an inlaid band of tin alloy d, having a dovetailed cross-section, within which type-depressions are formed.

4. In a device for casting and vulcanizing rubber type-wheels, the combination of a circular mold A, formed of two or more sectors, an inlaid band or ring of type-metal within the inner surface of which type-depressions are formed as and for the purpose set forth.

5. The combination of a circular mold A, formed of several sectors, a ring or band of type-metal inlaid in the inner cylindrical surface of said mold within which type-matrices are formed, and set screws for adjusting the mold sections against the periphery of the type-wheel.

THOS. T. ECKERT.
SIGMUND BERGMANN.

Witnesses as to the signature of Thos. E. Eckert:
THOS. F. CLARK,
WM. ARNOUX.

Witnesses as to the signature of Sigmund Bergmann:
JNO. F. GRIDEL,
WM. ARNOUX.